(12) United States Patent
Fischman et al.

(10) Patent No.: US 12,645,885 B2
(45) Date of Patent: Jun. 2, 2026

(54) METHOD AND SYSTEM FOR AUTOMATED DATA REDACTION

(71) Applicant: JPMorgan Chase Bank, N.A., New York, NY (US)

(72) Inventors: Lee Fischman, Scarsdale, NY (US); Leonidas Tolias, Westfield, NJ (US); Malin-Andrei A Barbuceanu, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 724 days.

(21) Appl. No.: 17/964,407

(22) Filed: Oct. 12, 2022

(65) Prior Publication Data

US 2024/0126996 A1 Apr. 18, 2024

(51) Int. Cl.
| | |
|---|---|
| *G06F 40/35* | (2020.01) |
| *G06F 16/23* | (2019.01) |
| *G06F 40/216* | (2020.01) |
| *G06N 20/00* | (2019.01) |
| *H04L 9/06* | (2006.01) |

(52) U.S. Cl.
CPC .......... *G06F 40/35* (2020.01); *G06F 16/2365* (2019.01); *G06F 40/216* (2020.01); *G06N 20/00* (2019.01); *H04L 9/0637* (2013.01)

(58) Field of Classification Search
CPC ... G06F 16/2365; G06F 40/216; G06N 20/00; H04L 9/0637
USPC ........................................................ 715/233
See application file for complete search history.

(56) References Cited

U.S. PATENT DOCUMENTS

| | | | | |
|---|---|---|---|---|
| 7,802,305 | B1 * | 9/2010 | Leeds ................. | G06F 16/2365 |
| | | | | 715/233 |
| 11,531,846 | B1 * | 12/2022 | Bodapati ................ | G06N 20/00 |
| 2019/0042568 | A1 * | 2/2019 | Balabine ............... | G06F 40/216 |
| 2020/0174990 | A1 * | 6/2020 | Pratkanis .............. | H04L 9/0637 |

* cited by examiner

*Primary Examiner* — Farzad Kazeminezhad
(74) *Attorney, Agent, or Firm* — GREENBLUM & BERNSTEIN, P.L.C.

(57) ABSTRACT

A method for facilitating automated data redaction in real-time based on a corpus of linguistic components is disclosed. The method includes monitoring, in real-time, a data stream between a variety of applications; detecting textual data in the data stream, the textual data including free-form dialog data; parsing the textual data to identify linguistic elements, the linguistic elements including words and phrases; determining whether redaction is required for each of the linguistic elements; comparing each of the linguistic elements with the corpus when redaction is not required; and modifying, in real-time, the data stream to replace the linguistic elements with hash values when the linguistic elements do not match the linguistic components in the corpus.

20 Claims, 5 Drawing Sheets

400

300

206(1)

202

204(1)

Linguistic
Components
Repository

Real-Time Data
Redaction
Management
Module
302

210

Feedback Database

210

206(2)

208(2)

208(1)

400

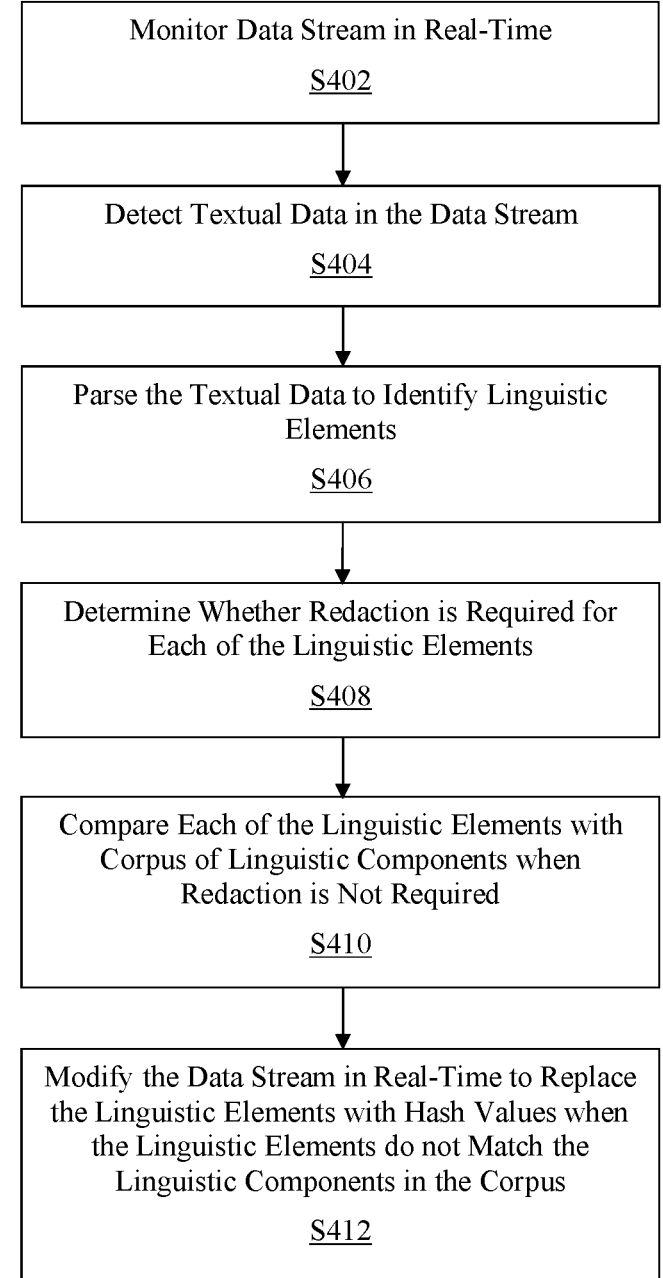

Monitor Data Stream in Real-Time
S402

Detect Textual Data in the Data Stream
S404

Parse the Textual Data to Identify Linguistic Elements
S406

Determine Whether Redaction is Required for Each of the Linguistic Elements
S408

Compare Each of the Linguistic Elements with Corpus of Linguistic Components when Redaction is Not Required
S410

Modify the Data Stream in Real-Time to Replace the Linguistic Elements with Hash Values when the Linguistic Elements do not Match the Linguistic Components in the Corpus
S412

FIG. 4

METHOD AND SYSTEM FOR AUTOMATED DATA REDACTION

BACKGROUND

1. Field of the Disclosure

This technology generally relates to methods and systems for redacting data, and more particularly to methods and systems for facilitating automated data redaction of a data stream in real-time based on a predefined corpus of linguistic components.

2. Background Information

Many business entities rely on data redaction to ensure that data at rest do not contain personally identifiable information such as, for example, email address data, proper name data, home address data, and company name data. Often, the data must be redacted prior to persistence in a networked repository to satisfy regulatory and business requirements. Historically, implementations of conventional data redaction techniques have resulted in varying degrees of success with respect to resource efficiency and redaction accuracy.

One drawback of using the conventional data redaction techniques is that in many instances, these techniques are bespoke for a particular use case and rely on specific catalogs of words to redact. As a result, redaction within phrases is not commonly offered. Additionally, due to the reliance on specific catalogs of words to redact, redaction accuracy may be lowered because data subject to redaction may not be known in advance for strings of free-form dialog.

Therefore, there is a need to facilitate automated data redaction of in-transit textual data in real-time by removing non-matching words and phrases according to a predefined corpus of linguistic components.

SUMMARY

The present disclosure, through one or more of its various aspects, embodiments, and/or specific features or sub-components, provides, inter alia, various systems, servers, devices, methods, media, programs, and platforms for facilitating automated data redaction of a data stream in real-time based on a predefined corpus of linguistic components.

According to an aspect of the present disclosure, a method for facilitating automated data redaction in real-time based on a corpus of linguistic components is disclosed. The method is implemented by at least one processor. The method may include monitoring, in real-time, a data stream between a plurality of applications; detecting textual data in the data stream, the textual data may include free-form dialog data; parsing the textual data to identify at least one linguistic element, the at least one linguistic element may include at least one from among a word and a phrase; determining whether redaction is required for each of the at least one linguistic element; comparing each of the at least one linguistic element with the corpus when redaction is not required; and modifying, in real-time, the data stream to replace the at least one linguistic element with at least one hash value when the at least one linguistic element does not match the linguistic components in the corpus.

In accordance with an exemplary embodiment, to determine whether redaction is required, the method may further include comparing each of the at least one linguistic element with a first predetermined set of sensitive words; modifying, in real-time using pattern recognition, the data stream to replace the at least one linguistic element with a corresponding label when the at least one linguistic element matches the sensitive words in the first predetermined set; comparing each of the at least one linguistic element with a second predetermined set of named entities when the at least one linguistic element does not match the sensitive words in the first predetermined set; and modifying, in real-time, the data stream to replace the at least one linguistic element with a corresponding tag when the at least one linguistic element matches the named entities in the second predetermined set.

In accordance with an exemplary embodiment, the corpus may correspond to a predefined collection of frequently used words that commonly occur in a language and do not represent proprietary data, the proprietary data may include personally identifiable information.

In accordance with an exemplary embodiment, the textual data may correspond to in-transit data in the data stream that is modified prior to persistence in a repository.

In accordance with an exemplary embodiment, the method may further include aggregating, via a graphical user interface, user input for each modification of the data stream; generating feedback data for each modification of the data stream, the feedback data may include corresponding information that relates to the parsing, the comparing, the modifying, and the user input; and persisting the feedback data in a feedback repository.

In accordance with an exemplary embodiment, the method may further include determining at least one new linguistic component based on the feedback data and a predetermined guideline, the predetermined guideline may include an operational guideline and a regulatory guideline; and updating the corpus to include the at least one new linguistic component, wherein the at least one new linguistic component may be determined by using at least one model.

In accordance with an exemplary embodiment, the at least one model may include at least one from among a machine learning model, a mathematical model, a process model, and a data model.

In accordance with an exemplary embodiment, to compare each of the at least one linguistic element with the corpus, the method may further include assigning the at least one linguistic element to a plurality of nodes in a distributed processing environment; and comparing, in parallel via the plurality of nodes, the assigned at least one linguistic element with the corpus.

According to an aspect of the present disclosure, a computing device configured to implement an execution of a method for facilitating automated data redaction in real-time based on a corpus of linguistic components is disclosed. The computing device including a processor; a memory; and a communication interface coupled to each of the processor and the memory, wherein the processor may be configured to monitor, in real-time, a data stream between a plurality of applications; detect textual data in the data stream, the textual data may include free-form dialog data; parse the textual data to identify at least one linguistic element, the at least one linguistic element may include at least one from among a word and a phrase; determine whether redaction is required for each of the at least one linguistic element; compare each of the at least one linguistic element with the corpus when redaction is not required; and modify, in real-time, the data stream to replace the at least one linguistic element with at least one hash value when the at least one linguistic element does not match the linguistic components in the corpus.

In accordance with an exemplary embodiment, to determine whether redaction is required, the processor may be further configured to compare each of the at least one linguistic element with a first predetermined set of sensitive words; modify, in real-time using pattern recognition, the data stream to replace the at least one linguistic element with a corresponding label when the at least one linguistic element matches the sensitive words in the first predetermined set; compare each of the at least one linguistic element with a second predetermined set of named entities when the at least one linguistic element does not match the sensitive words in the first predetermined set; and modify, in real-time, the data stream to replace the at least one linguistic element with a corresponding tag when the at least one linguistic element matches the named entities in the second predetermined set.

In accordance with an exemplary embodiment, the corpus may correspond to a predefined collection of frequently used words that commonly occur in a language and do not represent proprietary data, the proprietary data may include personally identifiable information.

In accordance with an exemplary embodiment, the textual data may correspond to in-transit data in the data stream that is modified prior to persistence in a repository.

In accordance with an exemplary embodiment, the processor may be further configured to aggregate, via a graphical user interface, user input for each modification of the data stream; generate feedback data for each modification of the data stream, the feedback data may include corresponding information that relates to the parsing, the comparing, the modifying, and the user input; and persist the feedback data in a feedback repository.

In accordance with an exemplary embodiment, the processor may be further configured to determine at least one new linguistic component based on the feedback data and a predetermined guideline, the predetermined guideline may include an operational guideline and a regulatory guideline; and update the corpus to include the at least one new linguistic component, wherein the at least one new linguistic component may be determined by using at least one model.

In accordance with an exemplary embodiment, the at least one model may include at least one from among a machine learning model, a mathematical model, a process model, and a data model.

In accordance with an exemplary embodiment, to compare each of the at least one linguistic element with the corpus, the processor may be further configured to assign the at least one linguistic element to a plurality of nodes in a distributed processing environment; and compare, in parallel via the plurality of nodes, the assigned at least one linguistic element with the corpus.

According to an aspect of the present disclosure, a non-transitory computer readable storage medium storing instructions for facilitating automated data redaction in real-time based on a corpus of linguistic components is disclosed. The storage medium including executable code which, when executed by a processor, may cause the processor to monitor, in real-time, a data stream between a plurality of applications; detect textual data in the data stream, the textual data may include free-form dialog data; parse the textual data to identify at least one linguistic element, the at least one linguistic element may include at least one from among a word and a phrase; determine whether redaction is required for each of the at least one linguistic element; compare each of the at least one linguistic element with the corpus when redaction is not required; and modify, in real-time, the data stream to replace the at least one linguistic element with at least one hash value when the at least one linguistic element does not match the linguistic components in the corpus.

In accordance with an exemplary embodiment, the corpus may correspond to a predefined collection of frequently used words that commonly occur in a language and do not represent proprietary data, the proprietary data may include personally identifiable information.

In accordance with an exemplary embodiment, the textual data may correspond to in-transit data in the data stream that is modified prior to persistence in a repository.

In accordance with an exemplary embodiment, the executable code may further cause the processor to aggregate, via a graphical user interface, user input for each modification of the data stream; generate feedback data for each modification of the data stream, the feedback data may include corresponding information that relates to the parsing, the comparing, the modifying, and the user input; and persist the feedback data in a feedback repository.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for facilitating automated data redaction of a data stream in real-time based on a predefined corpus of linguistic components.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
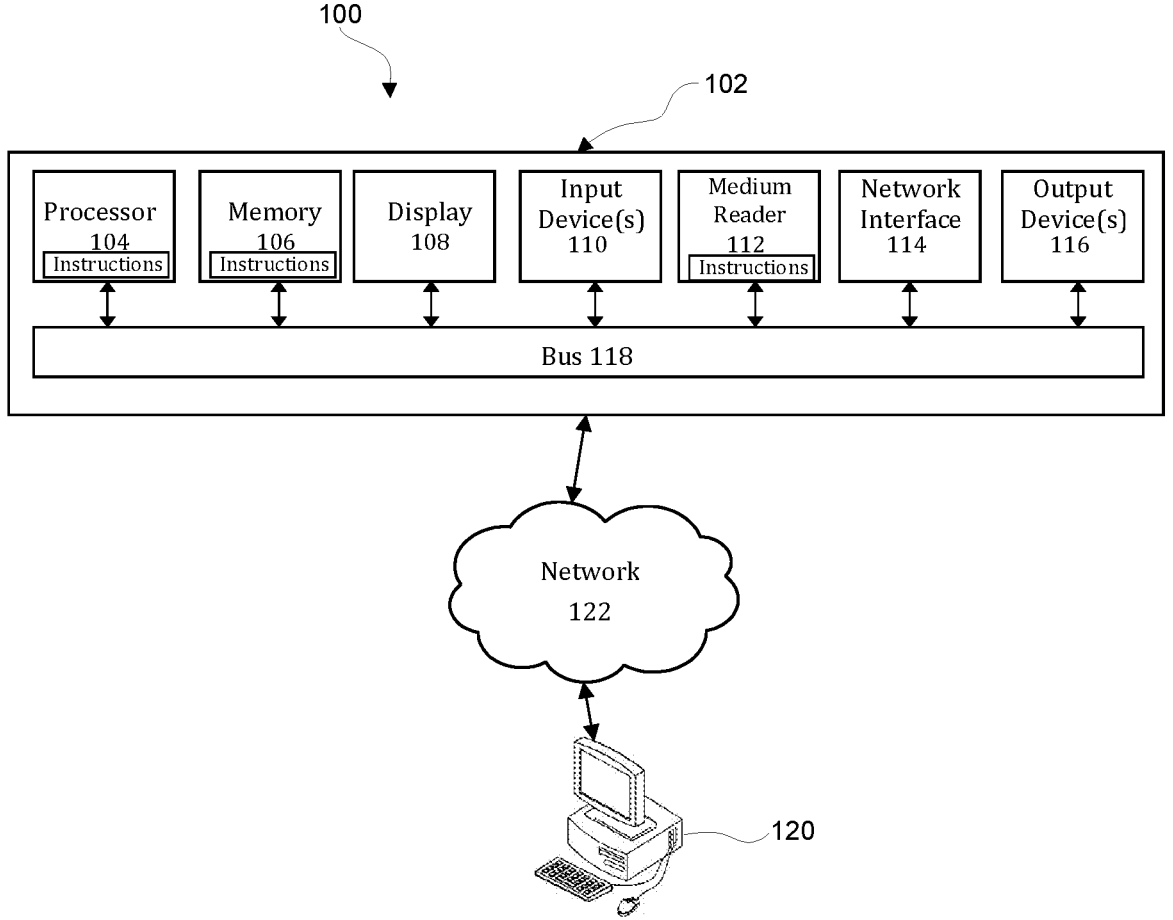
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automated data redaction of a data stream in real-time based on a predefined corpus of linguistic components.

Figure 2:
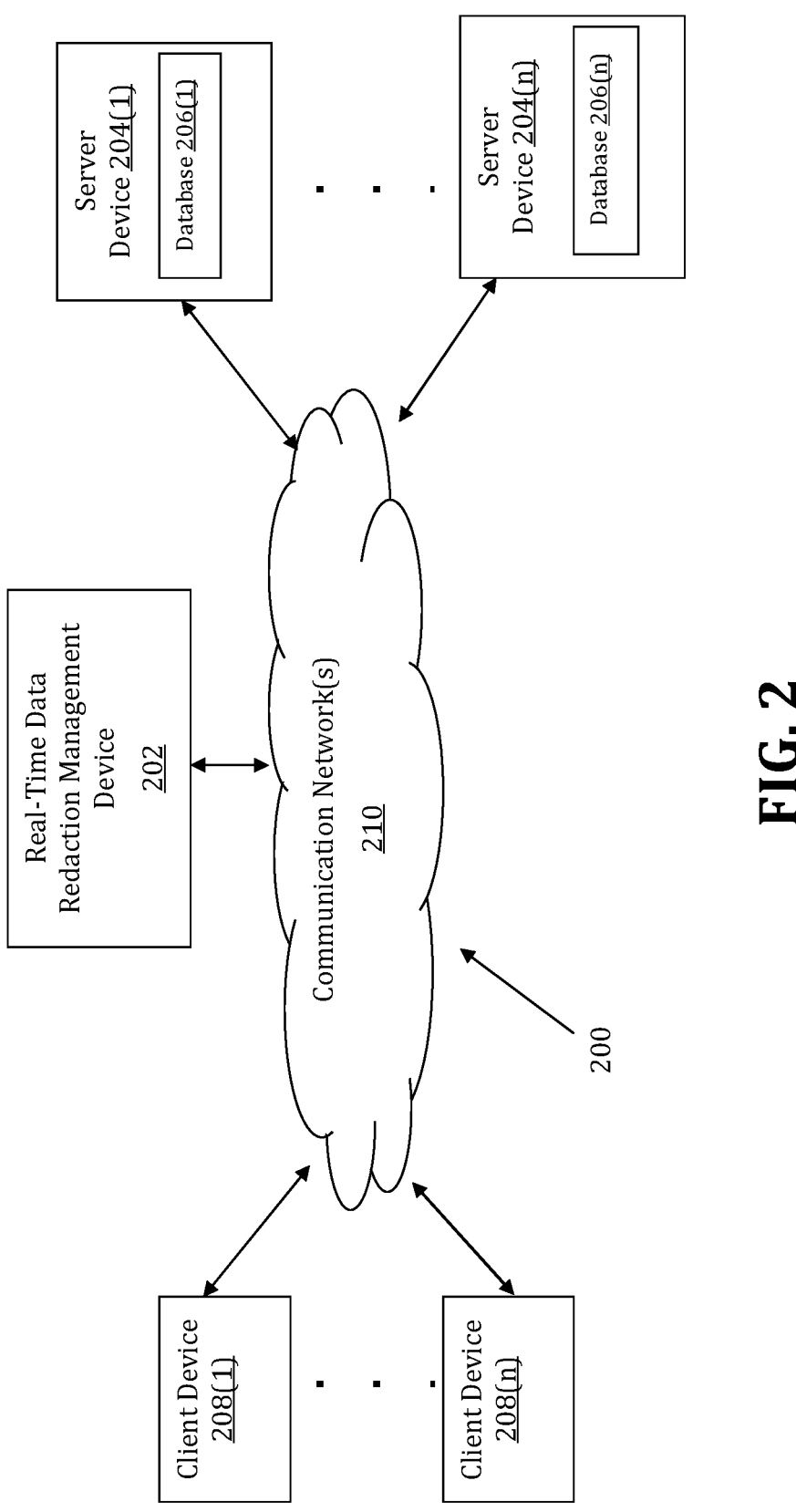
FIG. 2 illustrates an exemplary diagram of a network environment.

Referring to FIG. 2, a schematic of an exemplary network environment 200 for implementing a method for facilitating automated data redaction of a data stream in real-time based on a predefined corpus of linguistic components is illustrated. In an exemplary embodiment, the method is executable on any networked computer platform, such as, for example, a personal computer (PC).

The method for facilitating automated data redaction of a data stream in real-time based on a predefined corpus of linguistic components may be implemented by a Real-Time Data Redaction Management (RTDRM) device 202. The RTDRM device 202 may be the same or similar to the computer system 102 as described with respect to FIG. 1. The RTDRM device 202 may store one or more applications that can include executable instructions that, when executed by the RTDRM device 202, cause the RTDRM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTDRM device 202 itself, may be located in virtual server(s) running in a cloud-based computing environment rather than being tied to one or more specific physical network computing devices. Also, the application(s) may be running in one or more virtual machines (VMs) executing on the RTDRM device 202. Additionally, in one or more embodiments of this technology, virtual machine(s) running on the RTDRM device 202 may be managed or supervised by a hypervisor.

In the network environment 200 of FIG. 2, the RTDRM device 202 is coupled to a plurality of server devices 204(1)-204(n) that hosts a plurality of databases 206(1)-206(n), and also to a plurality of client devices 208(1)-208(n) via communication network(s) 210. A communication interface of the RTDRM device 202, such as the network interface 114 of the computer system 102 of FIG. 1, operatively couples and communicates between the RTDRM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTDRM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and RTDRM devices that efficiently implement a method for facilitating automated data redaction of a data stream in real-time based on a predefined corpus of linguistic components.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RTDRM device 202 may be a standalone device or integrated with one or more other devices or apparatuses, such as one or more of the server devices 204(1)-204(n), for example. In one particular example, the RTDRM device 202 may include or be hosted by one of the server devices 204(1)-204(n), and other arrangements are also possible. Moreover, one or more of the devices of the RTDRM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the RTDRM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store data that relates to data streams, applications, corpus of linguistic components, textual data, free-form dialog data, linguistic elements, and hash values.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the RTDRM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the RTDRM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the RTDRM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTDRM device 202, the server devices 204(1)-204(n), or the client devices 208(1)-208(n), for example, may be configured to operate as virtual instances on the same physical machine. In other words, one or more of the RTDRM device 202, the server devices 204(1)-204(n), or the client devices 208(1)-208(n) may operate on the same physical device rather than as separate devices communicating through communication network(s) 210. Additionally, there may be more or fewer RTDRM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
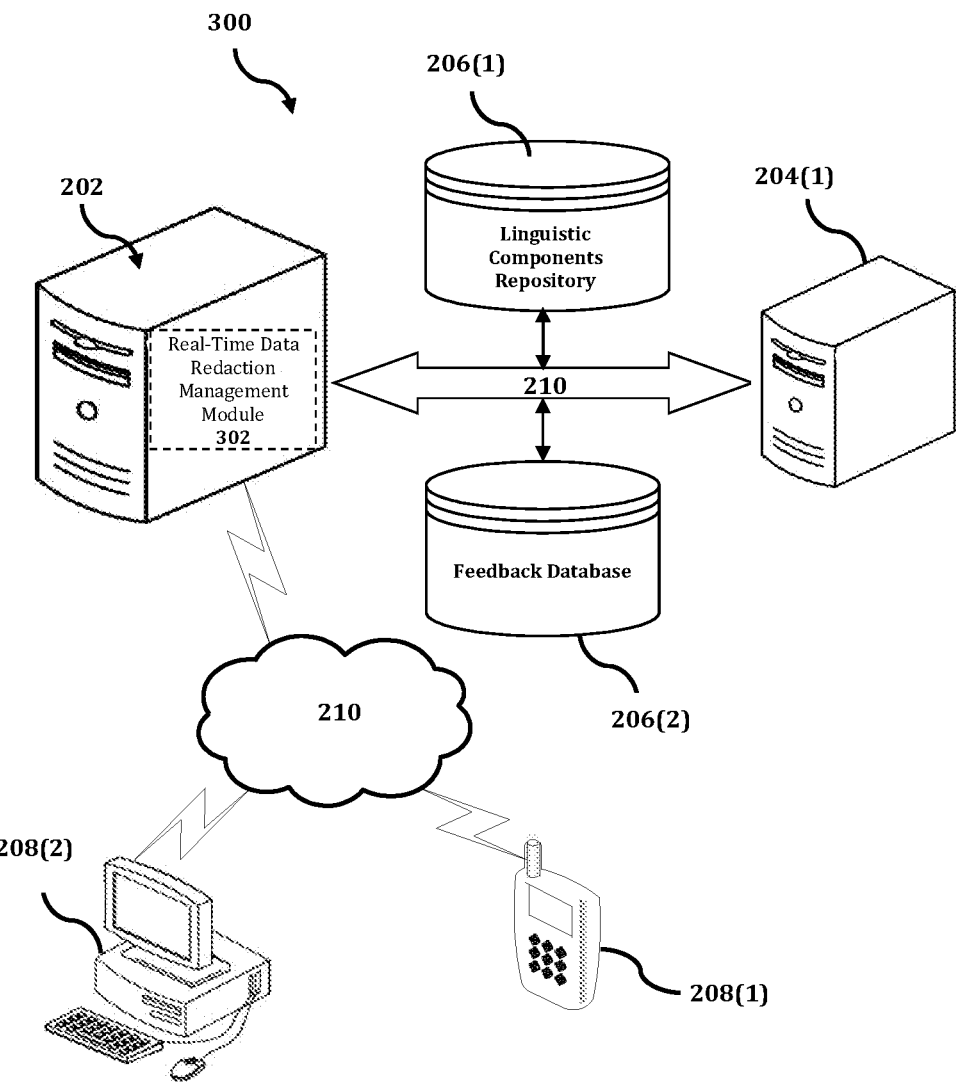
FIG. 3 shows an exemplary system for implementing a method for facilitating automated data redaction of a data stream in real-time based on a predefined corpus of linguistic components.

The RTDRM device 202 is described and shown in FIG. 3 as including a real-time data redaction management module 302, although it may include other rules, policies, modules, databases, or applications, for example. As will be described below, the real-time data redaction management module 302 is configured to implement a method for facilitating automated data redaction of a data stream in real-time based on a predefined corpus of linguistic components.

An exemplary process 300 for implementing a mechanism for facilitating automated data redaction of a data stream in real-time based on a predefined corpus of linguistic components by utilizing the network environment of FIG. 2 is shown as being executed in FIG. 3. Specifically, a first client device 208(1) and a second client device 208(2) are illustrated as being in communication with RTDRM device 202. In this regard, the first client device 208(1) and the second client device 208(2) may be "clients" of the RTDRM device 202 and are described herein as such. Nevertheless, it is to be known and understood that the first client device 208(1) and/or the second client device 208(2) need not necessarily be "clients" of the RTDRM device 202, or any entity described in association therewith herein. Any additional or alternative relationship may exist between either or both of the first client device 208(1) and the second client device 208(2) and the RTDRM device 202, or no relationship may exist.

Further, RTDRM device 202 is illustrated as being able to access a linguistic components repository 206(1) and a feedback database 206(2). The real-time data redaction management module 302 may be configured to access these databases for implementing a method for facilitating automated data redaction of a data stream in real-time based on a predefined corpus of linguistic components.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the RTDRM device 202 via broadband or cellular communication. Of course, these embodiments are merely exemplary and are not limiting or exhaustive.

Upon being started, the real-time data redaction management module 302 executes a process for facilitating automated data redaction of a data stream in real-time based on a predefined corpus of linguistic components. An exemplary process for facilitating automated data redaction of a data stream in real-time based on a predefined corpus of linguistic components is generally indicated at flowchart 400 in FIG. 4.

In the process 400 of FIG. 4, at step S402, a data stream between a plurality of applications in a networked environment may be monitored. The data stream may be monitored in real-time as data packets are sent between the plurality of applications via the data stream. In an exemplary embodiment, the data stream may correspond to the sequential transmission of various data between the plurality of applications. The data may be grouped into a series of data packets for the transmission. Consistent with present disclosures, the data packets may be intercepted to facilitate examination and analysis of constituent data within the data packets.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, textual data may be detected in the data stream. In an exemplary embodiment, the textual data may relate to data in the form of words and phrases that include alphabetic characters, numeric characters, and symbols. The textual data may include free-form data such as, for example, free-form dialog data. The free-form data may relate to textual data that does not conform to a regular or formal linguistic structure. For example, free-form dialog data may represent human speech in a natural language format as captured by a voice transcription service. The natural language format may result in textual data that does not have regular or formal linguistic structure.

In another exemplary embodiment, the textual data may correspond to in-transit data in the data stream. The in-transit data may correspond to data that is currently traveling between a source and a destination such as, for example, from the voice transcription service to a repository for storage. Consistent with present disclosures, the in-transit data may be interacted with and modified prior to reaching the intended destination, i.e., prior to persistence in the repository.

At step S406, the textual data may be parsed to identify linguistic elements. The linguistic elements may include at least one from among a word and a phrase that makes up the textual data. In an exemplary embodiment, parsing the textual data may include dividing the textual data into logical syntactic components to facilitate syntax analysis and/or syntactic analysis. The logical syntactic components may correspond to the words and phrases that make up the textual data.

In another exemplary embodiment, the word may correspond to a single distinct and meaningful linguistic factor that together forms the textual data. In many languages, the word may relate to a sequence of graphemes in a standard writing system that are delimited by spaces and graphical convention. In another exemplary embodiment, the phrase may correspond to a group of words that stand together as a conceptual unit. The phrases may consist of a single word or a group of several words.

At step S408, whether redaction is required for each of the linguistic elements may be determined. The redaction may be related to initial processing of the linguistic elements to replace and tag sensitive words and named entities. In an exemplary embodiment, the redaction process may include a first redaction stage and a second redaction stage. The first redaction stage may replace sensitive words with corresponding labels. The second redaction stage may replace named entities with corresponding tags. The first redaction stage and the second redaction stage may correspond to separate and independent stages that are implemented in sequential order. In another exemplary embodiment, the corresponding labels and the corresponding tags may relate to a generic descriptor that corresponds to the sensitive words and the named entities. For example, the corresponding label, i.e., generic descriptor for a sequence of business identifier codes (BIC) may be [BIC].

In another exemplary embodiment, to determine whether redaction is required, each of the linguistic elements may be initially compared with a first predetermined set of sensitive words. The first predetermined set may include digit words, room numbers, street names, email addresses, vehicle identification numbers (VIN), internet protocol versions (IPV4 and IPV6), media access control (MAC) addresses, uniform resource locators (URLs), payment card numbers, unique identifiers, SWIFT codes, and card verification value (CVV) codes.

Then, the data stream may be modified to replace the linguistic elements with a corresponding label when the linguistic elements match the sensitive words in the first predetermined set. The data stream may be modified in real-time by using pattern recognition. In another exemplary embodiment, to improve accuracy, the claimed system may additionally check whether specific words are present before each of the linguistic elements to identify a context for the linguistic elements. The context may reflect an intention of the user. In another exemplary embodiment, pattern recognition may relate to identification of subsequent linguistic elements that are similar to previously redacted linguistic elements. For example, subsequent street names that match a previously redacted street name may also be redacted from the data stream.

Additionally, each of the linguistic elements may be subsequently compared with a second predetermined set of named entities when the linguistic elements do not match the sensitive words in the first predetermined set. The second predetermined set may include names of people, values, and locations. For example, the names may correspond to a proper name of a city such as Washington D.C. Then, the data stream may be modified to replace the linguistic elements with a corresponding tag when the linguistic elements match the named entities in the second predetermined set. The data stream may be modified in real-time.

At step S410, each of the linguistic elements may be compared with a corpus of linguistic components when redaction is not required. Consistent with present disclosure, the redaction may be related to initial processing of the linguistic elements to replace and tag sensitive words and named entities. In an exemplary embodiment, the corpus may correspond to a predefined collection of frequently used words and phrases that commonly occur in a language. The frequently used words and phrases may not represent or indicate any proprietary data. The proprietary data may include personally identifiable information such as, for example, customer email address information, customer name information, customer address information, and associated company name information. In another exemplary embodiment, the proprietary data may include sensitive business information as determined by business guidelines that would be advantageous for a third-party. For example, the sensitive business information may include trade secret information.

In another exemplary embodiment, the corpus of linguistic components may relate to a dictionary of predetermined words that are commonly used and does not reveal any proprietary data. Consistent with present disclosures, a relatively limited number of words in any language may be sufficient to construct the vast majority of phrases that speakers of the language commonly create. Every word in a phrase may be efficiently compared to the dictionary of predetermined words. Resulting matches may be considered common and thus non-revealing, while non-matches may indicate proprietary data.

In another exemplary embodiment, the disclosed system may compare linguistic elements in the textual data against the dictionary of predetermined words to remove words and phrases that are not found within the dictionary. Conversely, words and phrases that are found within the dictionary of predetermined words may be retained. As such, without identifying specific data to redact such as, for example, a specific proper name, the system may compare the linguistic elements to commonly used words that are non-revealing to redact unanticipated proprietary data such as, for example, a previously unseen proper name.

In another exemplary embodiment, the linguistic elements may be compared against the dictionary of predetermined words by using a matching algorithm. The matching algorithm may correspond to a process or a set of rules that must be followed. For example, the matching algorithm may include a set of rules to compare each letter of a word in sequential order to determine a match. In another exemplary embodiment, the comparison of the linguistic elements against the dictionary of predetermined words may require implementation of several matching algorithms in multiple stages. Coordination of the matching algorithm in specified stages may improve effectiveness and efficiency of the comparison.

In another exemplary embodiment, the present of the linguistic elements in the corpus is checked not only for the original word, but also for corresponding lemmatized forms as well as other corresponding stemmed forms of the linguistic elements. By including the lemmatized forms and the stemmed forms of the linguistic elements, comparison accuracy may be achieved with a basic corpus of common words. The claimed system may also identify possible prefixes and suffixes for removal prior to the comparison based on a list of common prefixes and suffixes. Removal of the common prefixes and the common suffixes may improve efficiency and accuracy.

For each variation of the original linguistic elements, the similarity with existing words in the corpus may be checked. For example, when an original word is "unattainable" and the corpus only includes the base word "attain," The string similarity between the two words may be given by the formula, $$1-(\text{levenshtein distance/total number of chars}).$$

The levenshtein distance may correspond to the number of insert, delete, and modify operations required to turn one word into the second one. In this case, the formula may be, $$1-6/(6+12)=1-\tfrac{1}{3}=\tfrac{2}{3}.$$

In this example, the distance is approximately 0.66 which is below the accepted threshold of around 0.75. To avoid these inconsistencies, a set of similar words may be generated such as, for example, "unattain", "attain", and "attainable". The set of similar words may also be match against the corpus. Based on the matching of the set of similar words, "attain" will be present in the corpus and will not be redacted.

In another exemplary embodiment, multiple linguistic elements may be synchronously compared against the dictionary of predetermined words to improve operating efficiency. To facilitate the synchronous comparison, the linguistic elements may be assigned to a plurality of nodes in a distributed processing environment. The plurality of nodes may relate to computing devices such as, for example, computing equipment that are connected by a network. Then, the assigned linguistic elements may be compared with the corpus in parallel via the plurality of nodes.

At step S412, the data stream may be modified to replace the linguistic elements with hash values when the linguistic elements do not match the linguistic components in the corpus. The data stream may be modified in real-time to redact textual data in the data stream. For example, the data package in the data stream may be redacted in real-time while in transit before reaching the intended destination. In an exemplary embodiment, the hash values may correspond to a data string of a fixed length that uniquely identifies the replaced linguistic elements. The data string may include at least one from among numeric characters, alphabetic characters, and symbols.

Alternatively, in another exemplary embodiment, characteristics for each of the linguistic elements may be determined when the linguistic elements match the linguistic components in the corpus. The data stream may then be modified to tag the linguistic elements with the corresponding characteristics. Consistent with present disclosures, the data stream may be modified in real-time to tag the linguistic elements. For example, the data package in the data stream may be tagged in real-time while in transit before reaching the intended destination. In another exemplary embodiment, the characteristics may relate to an information type of the linguistic elements. For example, the characteristics may indicate that a particular linguistic element is related to a generic description of an event.

In another exemplary embodiment, user input may be aggregated for each modification of the data stream. The user input may be aggregated via a graphical user interface. The user input may relate to performance qualities of the automated data stream modification as perceived by a user such as, for example, an administrator of the disclosed system. Then, feedback data for each modification of the data stream may be generated. The feedback data may include corresponding information that relates to the parsing, the comparing, the modifying, and the user input. The generated feedback data may be associated with the corresponding modification instance and persisted in a repository such as, for example, a feedback repository.

In another exemplary embodiment, new linguistic components may be automatically determined based on the feedback data and a predetermined guideline. The predetermined guideline may include an operational guideline and a regulatory guideline. For example, new linguistic components may be automatically determined from the feedback data based on new regulation that requires redaction of new words and new phrases. In another exemplary embodiment, new linguistic components may be automatically determined by using a model such as, for example, a machine learning model. For example, new linguistic components may be automatically determined by using a machine learning model to analyze the feedback data to include new words and new phrases that improve redaction accuracy. Then, the corpus may be updated to include the new linguistic components.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

Figure 5:
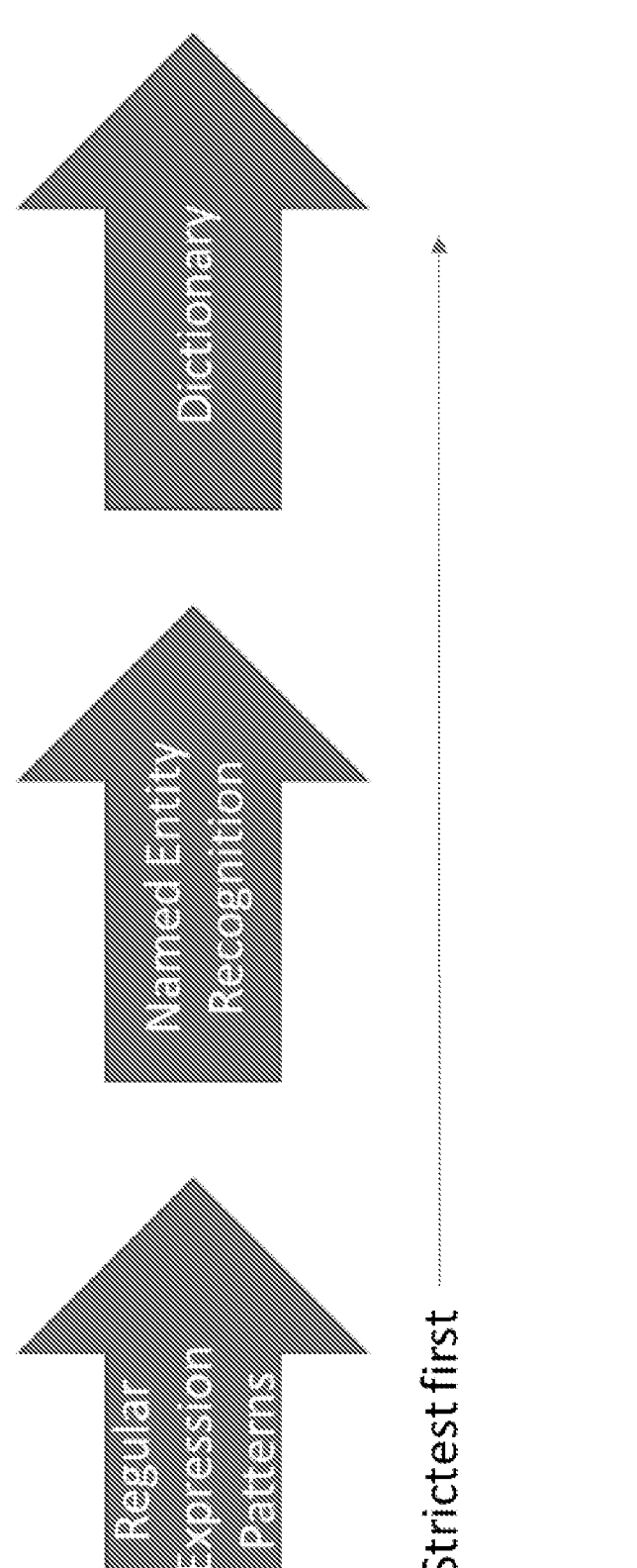
FIG. 5 is a flow diagram of an exemplary process for implementing a method for facilitating automated data redaction of a data stream in real-time based on a predefined corpus of linguistic components.

FIG. 5 is a flow diagram 500 of an exemplary process for implementing a method for facilitating automated data redaction of a data stream in real-time based on a predefined corpus of linguistic components. In FIG. 5, a plurality of redaction processes are provided consistent with present disclosure to facilitate automated data redaction. The plurality of redaction processes may be implemented sequentially in order based on redaction strictness.

As illustrated in FIG. 5, a first redaction stage may relate to a regular expression patterns redaction stage. In the first redaction stage, patterns may be used to replace sensitive words with labels. The first redaction stage may replace digit words, text numbers, and commonly redacted information. For example, the first redaction stage may replace digit word "two" with a corresponding numeral "2". Similarly, the first redaction stage may replace text numbers such as "one" and "two". Likewise, the commonly redacted information may relate to a street address, an email address, a VIN, IPV4 and IPV6 addresses, MAC addresses, URLs, card numbers, unique identifiers, SWIFT codes, CVV codes, and room numbers.

Then, the output from the first redaction stage may be passed to a second redaction stage. In the second redaction stage, named entity recognition techniques may be implemented to recognize named entities such as, for example, people, values, and locations. The recognized named entities may be tagged consistent with present disclosures. Finally, the output from the second redaction stage may be passed to a third redaction stage. In the third redaction stage, remaining unredacted text may be checked against a dictionary. The dictionary may include variations introduced by prefixes and suffixes consistent with present disclosures. For added effect, unredacted text that is very similar to a dictionary word may also be redacted. Redactions in the third redaction stage may include the replacement of redacted words with hash values.

Accordingly, with this technology, an optimized process for facilitating automated data redaction of a data stream in real-time based on a predefined corpus of linguistic components is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated data redaction in real-time based on a corpus of linguistic components, the method being implemented by at least one processor, the method comprising:

monitoring, by the at least one processor in real-time, a data stream between a plurality of applications;

detecting, by the at least one processor, textual data in the data stream, the textual data including free-form dialog data;

parsing, by the at least one processor, the textual data to identify a plurality of linguistic elements, each of the plurality of linguistic elements including at least one from among a word and a phrase;

redacting at least one of the plurality of linguistic elements, the redacting comprises replacing the at least one of the plurality of linguistic elements with a corresponding generic label that describes content of the at least one of the plurality of linguistic elements;

comparing, by the at least one processor, unredacted ones of the at least one of the plurality of linguistic elements that remain after the redacting with a corpus, the corpus including original words, lemmatized forms of the original words, stemmed forms of the original words, and similar words to the original words; and modifying, by the at least one processor in real-time, the data stream to replace any of the unredacted ones of the at least one of the plurality of linguistic elements with at least one hash value in response to the any of the unredacted ones of the at least one of the plurality of linguistic elements does not match the linguistic components in the corpus, the at least one hash value being a fixed length unique code.

2. The method of claim 1, further comprising:

aggregating, by the at least one processor via a graphical user interface, user input for each modification of the data stream;

generating, by the at least one processor, feedback data for each modification of the data stream, the feedback data including corresponding information that relates to the parsing, the comparing, the modifying, and the user input; and persisting, by the at least one processor, the feedback data in a feedback repository.

3. The method of claim 2, further comprising:

determining, by the at least one processor, at least one new linguistic component based on the feedback data and a predetermined guideline, the predetermined guideline including an operational guideline and a regulatory guideline; and updating, by the at least one processor, the corpus to include the at least one new linguistic component, wherein the at least one new linguistic component is determined by using at least one model.

4. The method of claim 3, wherein the at least one model includes at least one from among a machine learning model, a mathematical model, a process model, and a data model.

5. The method of claim 1, the redacting further comprising:

comparing, by the at least one processor, each of the plurality of linguistic elements with a first predetermined set of non-name sensitive words;

modifying, by the at least one processor in real-time using pattern recognition, the data stream to replace any of the plurality of linguistic elements with the corresponding generic label in response to the any of the plurality of linguistic elements matches the sensitive words in the first predetermined set;

comparing, by the at least one processor, unredacted ones of the plurality of linguistic elements with a second predetermined set of named entities; and modifying, by the at least one processor in real-time, the data stream to replace any of the unredacted ones of the plurality of linguistic elements with a corresponding generic tag in response to the any of the unredacted ones of the plurality of linguistic elements matches the named entities in the second predetermined set, the corresponding generic tag describing the content of a corresponding linguistic element.

6. The method of claim 1, wherein the corpus corresponds to a predefined collection of frequently used words that commonly occur in a language and do not represent proprietary data, the proprietary data including personally identifiable information.

7. The method of claim 1, wherein the comparing unredacted ones of the at least one of the plurality of linguistic elements with a corpus further comprises:

assigning, by the at least one processor, the plurality of linguistic elements to a plurality of nodes in a distributed processing environment; and comparing, by the at least one processor in parallel via the plurality of nodes, the assigned plurality of linguistic elements with the corpus.

8. The method of claim 1, wherein:

the at least one of the plurality of linguistic elements is a specific business identifier code, and the corresponding generic label identifies the at least one of the plurality of linguistic elements generally as a business code identifier without the specific business identifier code.

9. A computing device configured to implement an execution of a method for facilitating automated data redaction in real-time based on a corpus of linguistic components, the computing device comprising:

a processor;

a memory; and a communication interface coupled to each of the processor and the memory, wherein the processor is configured to:

monitor, in real-time, a data stream between a plurality of applications;

detect textual data in the data stream, the textual data including free-form dialog data;

parse the textual data to identify a plurality of linguistic elements, each of the plurality of linguistic elements including at least one from among a word and a phrase;

redact at least one of the plurality of linguistic elements, the redact comprises replacing the at least one of the plurality of linguistic elements with a corresponding generic label that describes content of the at least one of the plurality of linguistic elements;

compare unredacted ones of the at least one of the plurality of linguistic elements that remain after the redact with a corpus, the corpus including original words, lemmatized forms of the original words, stemmed forms of the original words, and similar words to the original words; and modify, in real-time, the data stream to replace any of the unredacted ones of the at least one of the plurality of linguistic elements with at least one hash value in response to the any of the unredacted ones of the at least one of the plurality of linguistic elements does not match the linguistic components in the corpus, the at least one hash value being a fixed length unique code.

10. The computing device of claim 9, wherein the processor is further configured to:

aggregate, via a graphical user interface, user input for each modification of the data stream;

generate feedback data for each modification of the data stream, the feedback data including corresponding information that relates to the parse, the compare, the modify, and the user input; and persist the feedback data in a feedback repository.

11. The computing device of claim 10, wherein the processor is further configured to:

determine at least one new linguistic component based on the feedback data and a predetermined guideline, the predetermined guideline including an operational guideline and a regulatory guideline; and update the corpus to include the at least one new linguistic component, wherein the at least one new linguistic component is determined by using at least one model.

12. The computing device of claim 11, wherein the at least one model includes at least one from among a machine learning model, a mathematical model, a process model, and a data model.

13. The computing device of claim 9, wherein, to the redact further comprises:

compare each of the plurality of linguistic elements with a first predetermined set of non-name sensitive words;

modify, in real-time using pattern recognition, the data stream to replace any of the plurality of linguistic elements with the corresponding generic label in response to the any of the plurality of linguistic elements matches the sensitive words in the first predetermined set;

compare unredacted ones of the plurality of linguistic elements with a second predetermined set of named entities; and modify, in real-time, the data stream to replace any of the unredacted ones of the plurality of linguistic elements with a corresponding generic tag in response to the any of the unredacted ones of the plurality of linguistic elements matches the named entities in the second predetermined set, the corresponding generic tag describing the content of a corresponding linguistic element.

14. The computing device of claim 9, wherein the corpus corresponds to a predefined collection of frequently used words that commonly occur in a language and do not represent proprietary data, the proprietary data including personally identifiable information.

15. The computing device of claim 9, wherein, to compare unredacted ones of the at least one of the plurality of linguistic elements with a corpus, the processor is further configured to:

assign the plurality of linguistic elements to a plurality of nodes in a distributed processing environment; and compare, in parallel via the plurality of nodes, the assigned plurality of linguistic elements with the corpus.

16. The computing device of claim 9, wherein:

the at least one of the plurality of linguistic elements is a specific business identifier code, and the corresponding generic label identifies the at least one of the plurality of linguistic elements generally as a business code identifier without the specific business identifier code.

17. A non-transitory computer readable storage medium storing instructions for facilitating automated data redaction in real-time based on a corpus of linguistic components, the storage medium comprising executable code which, when executed by a processor, causes the processor to:

monitor, in real-time, a data stream between a plurality of applications;

detect textual data in the data stream, the textual data including free-form dialog data;

parse the textual data to identify a plurality of linguistic elements, each of the plurality of linguistic elements including at least one from among a word and a phrase;

redact for at least one of the plurality of linguistic elements, the redact comprises replacing the at least one of the plurality of linguistic elements with a corresponding generic label that describes content of the at least one of the plurality of linguistic elements;

compare unredacted ones of the at least one of the plurality of linguistic elements that remain after the redact with a corpus, the corpus including original words, lemmatized forms of the original words, stemmed forms of the original words, and similar words to the original words; and modify, in real-time, the data stream to replace any of the unredacted ones of the at least one of the plurality of linguistic elements with at least one hash value in response to the any of the unredacted ones of the at least one of the plurality of linguistic elements does not match the linguistic components in the corpus, the at least one hash value being a fixed length unique.

18. The storage medium of claim 17, wherein the corpus corresponds to a predefined collection of frequently used words that commonly occur in a language and do not represent proprietary data, the proprietary data including personally identifiable information.

19. The storage medium of claim 17, wherein, when executed by the processor, the executable code further causes the processor to:

aggregate, via a graphical user interface, user input for each modification of the data stream;

generate feedback data for each modification of the data stream, the feedback data including corresponding information that relates to the parsing, the comparing, the modifying, and the user input; and persist the feedback data in a feedback repository.

20. The storage medium of claim 17, wherein:

the at least one of the plurality of linguistic elements is a specific business identifier code, and the corresponding generic label identifies the at least one of the plurality of linguistic elements generally as a business code identifier without the specific business identifier code.

* * * * *